United States Patent [19]
Bentz

[11] Patent Number: 5,409,306
[45] Date of Patent: Apr. 25, 1995

[54] TRACK ASSEMBLY

[75] Inventor: Helmut Bentz, Dortmund, Germany

[73] Assignee: Caterpillar Inc., Peoria, Ill.

[21] Appl. No.: 158,340

[22] Filed: Nov. 29, 1993

[51] Int. Cl.⁶ .......................................... B62D 55/18
[52] U.S. Cl. .................................. 305/39; 305/56; 305/58 R
[58] Field of Search ............... 305/39, 54, 57, 58 R, 305/58 PC, 56

[56] References Cited

U.S. PATENT DOCUMENTS

| | | | |
|---|---|---|---|
| 2,116,834 | 5/1938 | Kegresse | 305/56 |
| 3,333,903 | 8/1967 | Orr et al. | 305/57 X |
| 3,680,928 | 8/1972 | Kraschnewski et al. | 305/57 |
| 4,139,240 | 2/1979 | Profio et al. | 305/39 |
| 4,176,887 | 12/1979 | Alpers | 305/57 |
| 4,241,956 | 12/1980 | Meisel, Jr. | 305/57 X |
| 4,425,007 | 1/1984 | Soeteber | 305/11 |

FOREIGN PATENT DOCUMENTS

| | | | |
|---|---|---|---|
| 1141803 | 2/1983 | Canada | 305/58 R |
| 537202 | 6/1921 | France | 305/56 |

*Primary Examiner*—Russell D. Stormer
*Attorney, Agent, or Firm*—Calvin E. Glastetter

[57] ABSTRACT

A track assembly comprising an endless track chain made up of identical track links and a cooperating sprocket wheel. The track link is formed with a ground engaging surface, a running surface and hinge members suitable to interact with hinge members on adjacent track links. The track link has a central drive cam and a guide. The cooperating sprocket wheel is formed of two laterally spaced running rims and a plurality of circumferentially spaced drive teeth engageable with the raised drive cam of the track link. The running rim has a side surface engageable with the guide.

8 Claims, 4 Drawing Sheets

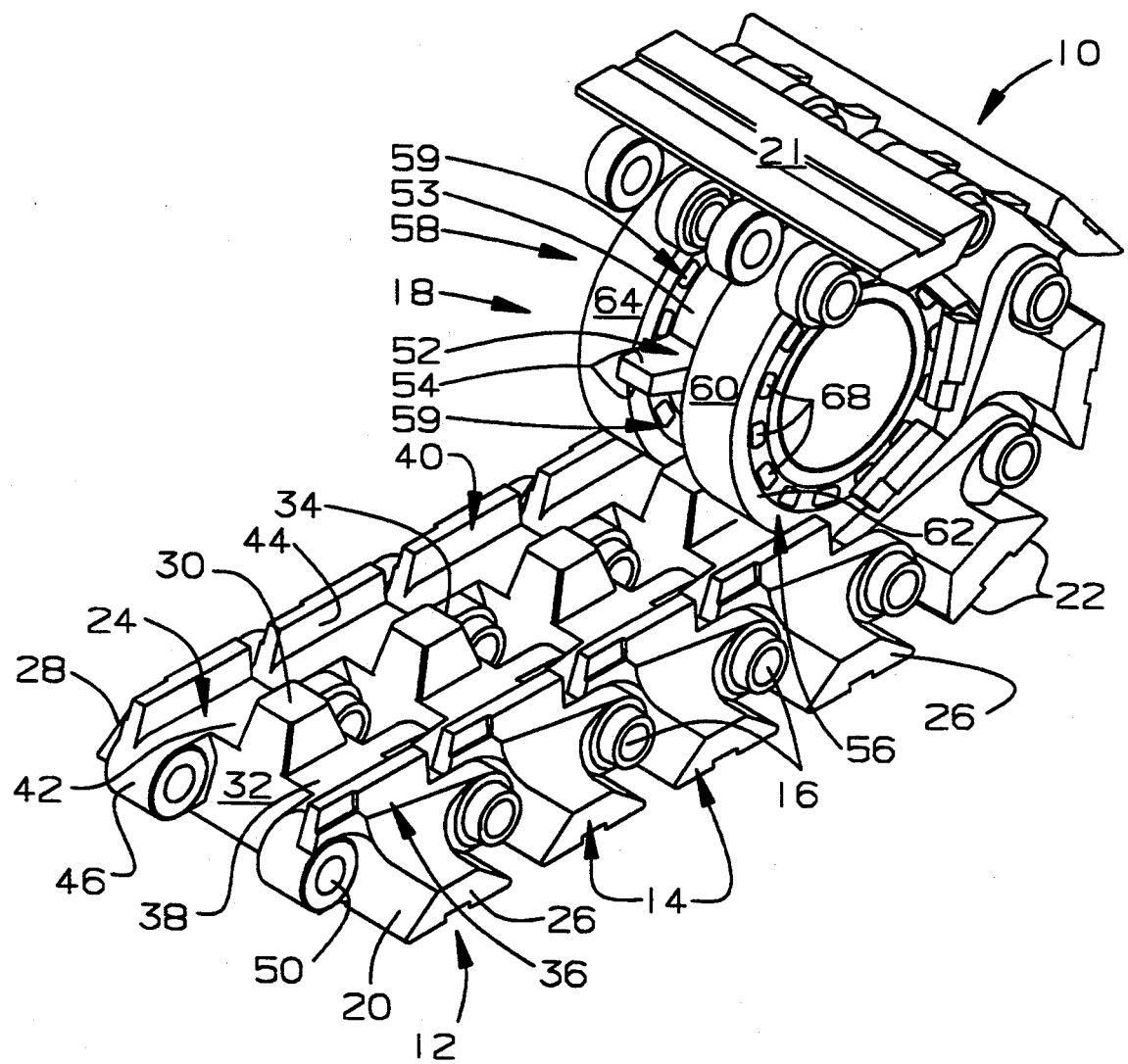
Fig_1_

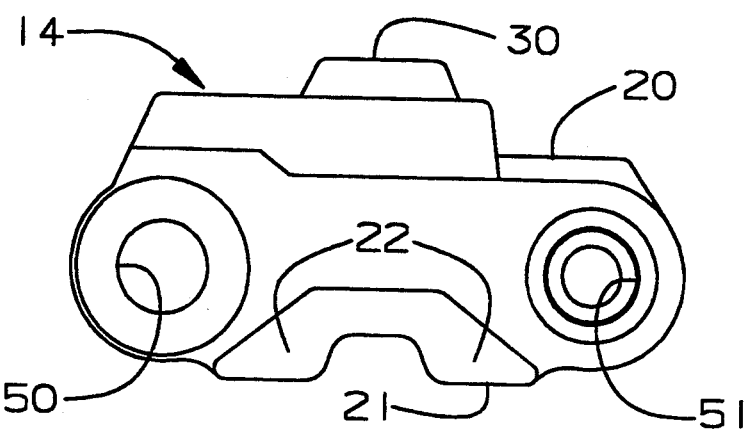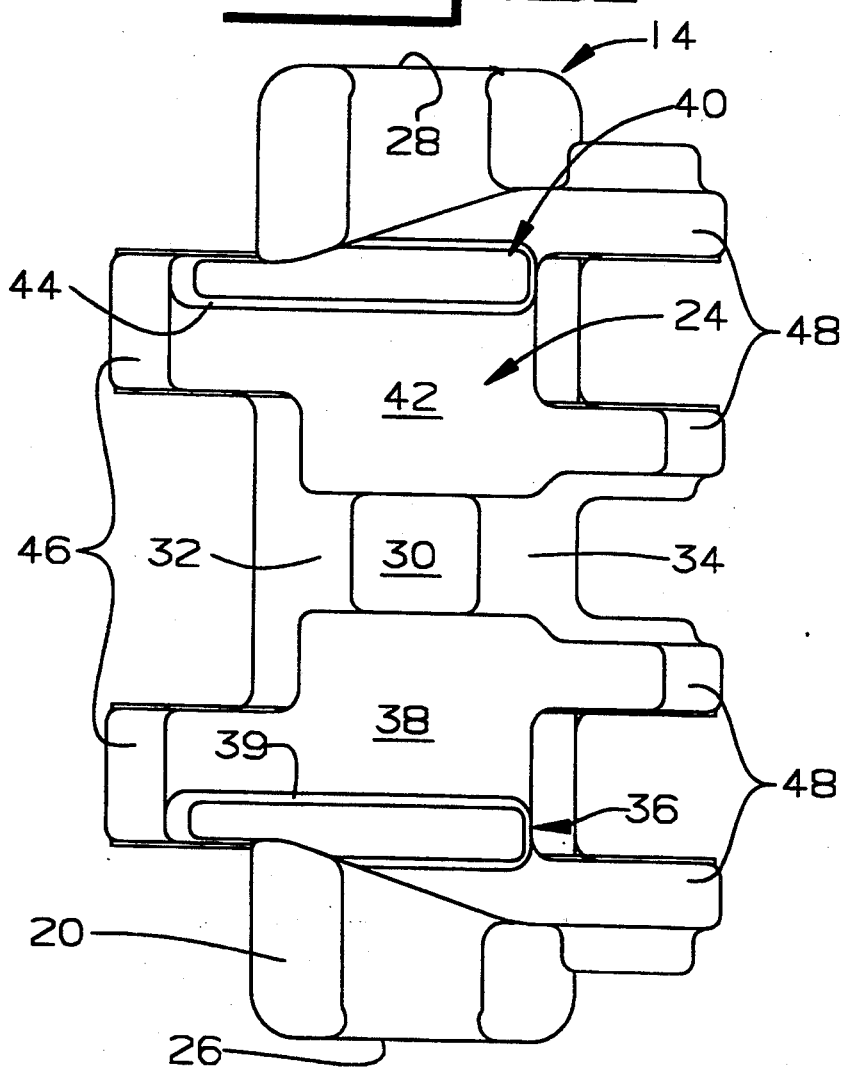

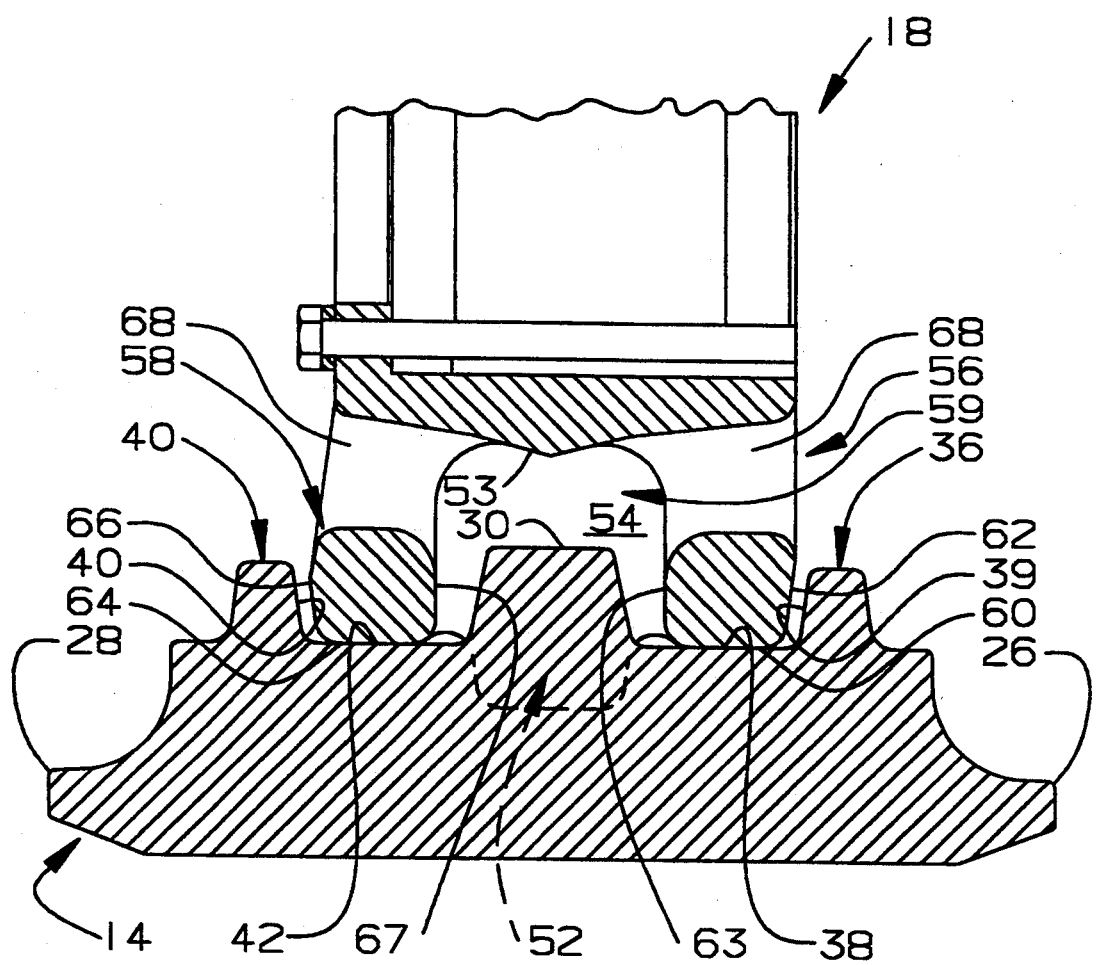

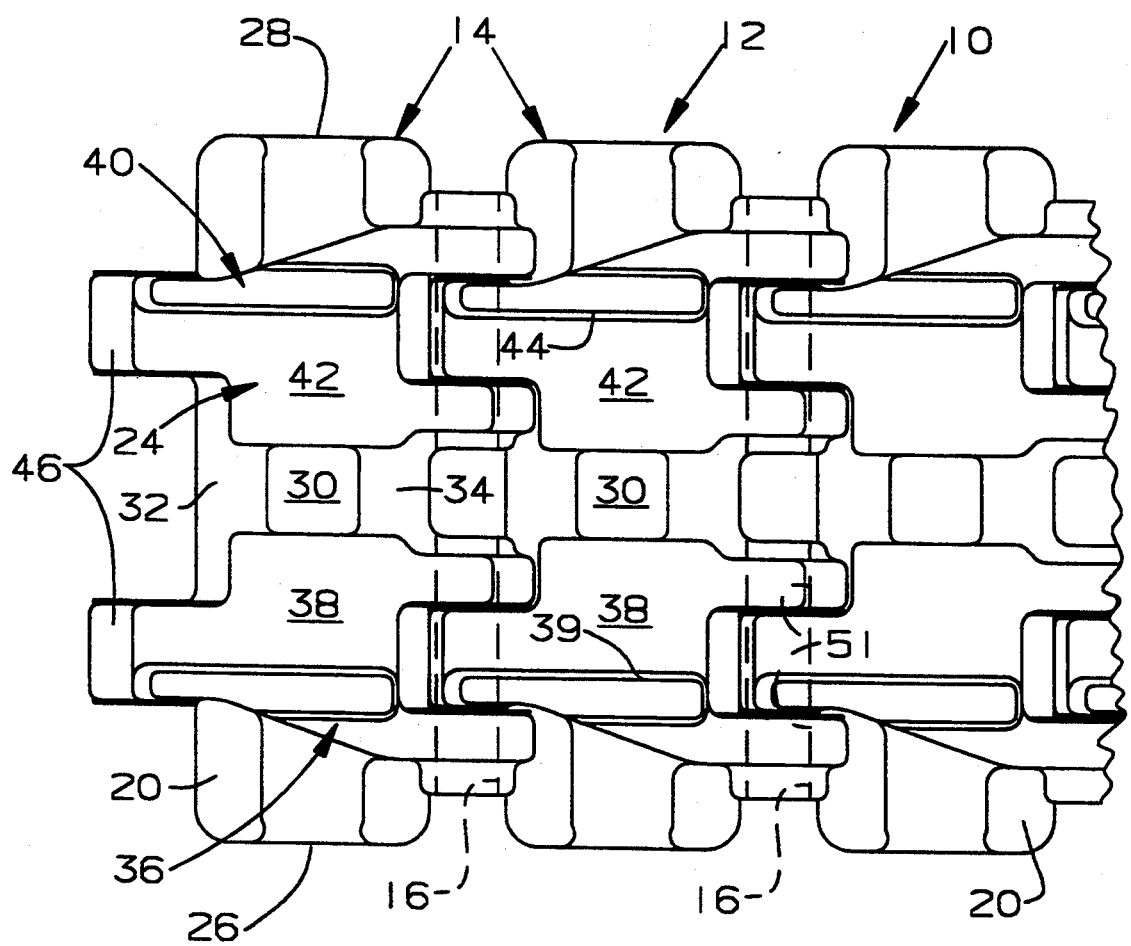
Fig_5_

TRACK ASSEMBLY

TECHNICAL FIELD

This invention relates generally to a track assembly for a machine and more particularly to a track link having guides positioned to interact with side surfaces on the sprocket.

BACKGROUND ART

Track assemblies are useful for propelling and supporting large machines during operation of the machine. The track systems included a central flange on the sprocket wheel which was used to guide the track chain. A plurality of teeth for driving the track chain were also formed on the flange. The track links were formed with a drive cam and a guide surface positioned on the central portion of the track link. One problem associated with such a drive system was that the guide system was located at the central portion which could allow the link to twist. The cam was also lower then the running surface which required the teeth on the sprocket to extend a greater distance from the sprocket.

The present invention is directed to overcoming one or more of the problems as set forth above.

DISCLOSURE OF THE INVENTION

In one aspect of the present invention a track assembly includes a sprocket wheel having two running rims laterally offset from one another and a plurality of drive teeth positioned between the running rims which project radially outwardly thereof. Pockets are located between adjacent drive teeth. The sprocket wheel has outer side surfaces extending radially inwardly from the running rims. A plurality of track links are connected to one another to form an endless chain engageable with the sprocket wheel. The links each have a link body that has a ground engaging outer surface and an inner face. A drive cam projects inwardly from the central region of the inner face and is receivable within a respective one of the pockets of the sprocket wheel. A flat running surface is adjacent each side of the drive cam. A guide means projects inwardly from the inner face and is positioned between the flat running surface and an outer edge for contact with the outer side surface of the sprocket wheel.

Another aspect of the invention provides a link having a body with a pair of laterally spaced flat running surfaces. A central drive cam is disposed between the spaced running surfaces and extends thereof. A pair of laterally spaced guide flanges are positioned on opposite lateral sides of the central drive cam lateral outwardly and adjacent to the respective running surface.

The present invention provides a track assembly which has an endless track chain having central drive cams and outer edge guide means for contacting an outer side guide surface on the sprocket.

BRIEF DESCRIPTION OF THE DRAWINGS

FIG. 1 is an isometric view of the present track assembly;

FIG. 2 is an end view of a track link;

FIG. 3 is a plan view of the track link;

FIG. 4 is a sectional view of the track assembly; and

FIG. 5 is a plan view of adjacent track links.

BEST MODE FOR CARRYING OUT THE INVENTION

Referring to FIG. 1, a track assembly 10 includes an endless track chain 12 having a plurality of track links 14 connected together by a plurality of track pins 16. The track assembly 10 further includes a sprocket wheel 18 for driving and guiding the endless track chain 12.

The endless track chain 12 will normally pass under track rollers (not shown) that support the machine and the track chain will then mesh with the cooperating sprocket wheel which is located at one end of the track chain and then travel around to a toothless idler wheel (not shown) at the other end of the track chain. This provides a drive system for propelling the machine along the ground.

For purposes of clarity in the following description, the direction of travel of the track links in the track drive system when the machine is moving forward will be called the forward direction and the direction of travel of the track links when the machine is moving in reverse will be called the aft direction. Further, the direction across the track link from one end to the other end will be referred to as the lateral direction.

The plurality of track links 14 are identical and thus only one will be described in detail. Each track link 14 is a single piece casting having a body 20 and on its side contacting the ground an engagement plate 21 is provided with a pair of grousers 22 which extend over the entire lateral width of the link 14 transversely to the direction of travel. The body 20 of the track link 14 is a rectangular shape having a flat surface 24 opposite the engagement plate 22, a first end 26 and a second end 28. To further facilitate the description, the direction through the track link 14 from the flat surface 24 towards the ground engagement plate 21 of the link 14 will be referred to as radially outward, and the direction from the ground engagement plate 21 of the link 14 towards the flat surface 24 will be referred to as radially inward. A central drive cam 30 projects radially inward from the central portion of the flat surface 24. The central drive cam 30 includes a first engagement surface 32 and a second engagement surface 34 opposite the first engagement surface 32. The central drive cam has a predetermined lateral width. A first guide means 36 projects radially inward from the flat surface 24. The first guide means 36 is positioned between the central drive cam 30 and the first end 26. The flat surface area between the central drive cam and the first guide means 36 forms a first running surface 38. The first guide means 36 includes an inclined engagement flange 39 facing the central drive cam 30. A second guide means 40 projects radially inward from the flat surface 24. The second guide means 40 is positioned between the central drive cam 30 and the second end 28. The flat surface area between the central drive cam and the second guide means 40 forms a second running surface 42. The second guide means 40 includes an inclined engagement flange 44 facing the raised central drive cam 30. The guide flanges 39, 44 are spaced from the central cam a predetermined distance. The track link 14 has a pair of hinge members 46 which project therefrom parallel to the direction of travel, in-line with a corresponding flat running surface. A pair of bifurcated hinge members 48 project from the track link 14 opposite the pair of hinge members 46. The hinge members 46, 48 interact with corresponding hinge members of adjacent track links 14. The hinge member 46 has a lateral bore 50. The hinge member 48 has a radial bore 51. The track pin 16 is inserted into the bores 50, 51 to connect adjacent track links together.

The sprocket wheel 18 includes a plurality of central drive teeth 52 equally spaced around a periphery 53 of the sprocket wheel 18 and project outwardly therefrom. The central drive teeth 52 are positioned for engagement with the central drive cam 30 of the track link 14. Each one of the drive teeth 52 have a base which is attached to the periphery 53 of the sprocket wheel 18 and projects outwardly therefrom. The drive teeth 52 are provided, on sides facing each other, with engagement surfaces 54 which interact with the first and second engagement surfaces 32, 34 of the raised drive cam. The sprocket wheel 18 includes a first running rim 56 adjacent one side of the central drive teeth 52 and a second running rim 58 adjacent the opposite side of the central drive teeth 52. The running rims 56, 58 have a larger diameter then the periphery 53. The running rims 56, 58 and the periphery 53 form a plurality of u-shaped pockets 59 having a radial opening for receiving the drive cam 30 of the track link 14. The pockets 59 are located between adjacent drive teeth 52. The first running rim 56 includes an annular outer diameter 60 which runs on the first running surface .38 of the track link 14, and an outer side surface 62 for contact with the inclined engagement flange 39 of the first guide means 36. The running rim 56 has an inner side surface 63 which forms a wall of the u-shaped pocket 59. The second running rim 58 includes an annular outer diameter 64 which runs on the second running surface 42 of the track link 14, and an outer side surface 66 for contact with the inclined engagement flange 44 of the guide means 40. The running rim 58 has an inner side surface 67 which forms a wall of the u-shaped pocket 59. The u-shaped pockets 59 have a predetermined lateral width sized to prevent contact with the central drive cam 30 of the track link 14. A plurality of passages 68 are formed in the sprocket wheel 18. The passages 68 extend laterally from the u-shaped pockets 59 to the side of the sprocket wheel 18 to allow dirt to be expelled from the u-shaped pockets 59.

Industrial Applicability

In use of the track drive assembly 10 of the present invention the track chain 12 includes a plurality of track links 14 which are connected together by a plurality of track pins 16 to form an endless track chain 12. The track link 14 has a central drive cam 30 which projects inwardly from the flat surface 24. The track link 14 further includes raised guide means 36, 40 which extend inwardly from the flat surface 24. The guide means 36, 40 are positioned at the lateral ends of the track link 14 and extend in the fore and aft direction along the flat surface 24. A sprocket wheel 18 has central drive teeth 52 which extends outwardly and cooperates with the first engagement surface 32 of the drive cam 30 to propel the machine in a forward direction. The central drive teeth 52 cooperate with the second engagement surface 34 to propel the machine in a reverse direction. The sprocket wheel 18 has laterally spaced running rims 56, 58 which are supported by the flat running surface 24. The sprocket wheel 18 has outer side surfaces 62, 66 positioned for cooperation with guide means 36, 40 on the track link 14. The sprocket wheel 18 and track link 14 are constructed and arranged to permit contact between the side surfaces 62, 66 and the flanges 39, 44 and thus prevent contact between the central drive cam 30 and the inner surfaces 63, 67. The outer side surfaces 62, 66 are spaced from the guide flanges 39, 44 a first predetermined distance. The inner side surfaces 63, 67 are spaced from the central drive cam 30 of the track link a second predetermined distance which is greater then the first predetermined distance to prevent contact between the inner side surfaces 63, 67 and the central drive cam 30.

In view of the forgoing, it is readily apparent that the structure of the present invention provides a track drive assembly which provides a means for guiding the track link as the machine is propelled in a forward and rearward direction.

Other aspects, objects and advantages of this invention can be obtained from a study of the drawing, the disclosure and the appended claims.

I claim:

1. A track assembly, comprising:
a plurality of links pivotally connected to one another to form an endless track chain, the links each having a link body that has a ground engaging outer surface and an inner face, a drive cam projects inwardly from the central region of the inner face and is adaptable to drivingly engage a sprocket wheel when assembled therewith, a flat running surface adjacent each side of the drive cam and a guide means projecting inwardly from the inner face between the flat running surface and an outer edge and adapted for contact with an outer side surface of the sprocket wheel when assembled therewith, the links each further include projecting hinge members which interact with projecting hinge members on adjacent links and are each positioned substantially, longitudinally in-line with a respective one of the flat running surfaces.

2. The track assembly of claim 1 wherein each pair of adjacent links are joined together by two track pins located one on each side of the central drive cam and which extends across the width of the respective flat running surface.

3. The track assembly of claim 1 wherein the drive cam includes oppositely facing lateral side surfaces which are adapted to be free of lateral guiding contact with facing inner surfaces of the sprocket wheel when assembled therewith.

4. The track assembly of claim 1 wherein the projecting hinge members define a portion of the flat running surfaces.

5. A track link, comprising:
a body having a pair of laterally spaced flat running surfaces, a central drive cam disposed between the spaced running surfaces and extending outwardly thereof, a pair of laterally spaced guide flanges positioned on opposite lateral sides of the central drive cam laterally outwardly of and adjacent to the respective running surface and projecting hinge members which are each positioned substantially, longitudinally in-line with a respective one of the flat running surfaces.

6. The track link of claim 5 wherein the projecting hinge members define a portion of the flat running surfaces.

7. The track link of claim 6 wherein the projecting hinge members are located outwardly of the flat running surfaces and the drive cam is integral with the link body.

8. A track assembly, comprising:

a sprocket wheel having two running rims laterally offset from one another, a plurality of drive teeth positioned between the running rims projecting radially outwardly thereof, pockets located between adjacent drive teeth, and outer side surfaces extending radially inwardly from the running rims; and a plurality of links connected to one another to form an endless track chain engageable with the sprocket wheel, the links each having a link body that has a ground engaging outer surface and an inner face, a drive cam projects inwardly from the central region of the inner face and is receivable within a respective one of the pockets of the sprocket wheel, a flat running surface adjacent each side of the drive cam and a guide means projecting inwardly from the inner face and positioned between the flat running surface and an outer edge for contact with the outer side surface of the sprocket wheel, the link body further including projecting hinge members which interact with projecting hinge members on adjacent links and are each positioned substantially, longitudinally in-line with a respective one of the flat running surfaces.

* * * * *